US007771095B2

(12) United States Patent
Dorogi

(10) Patent No.: US 7,771,095 B2
(45) Date of Patent: Aug. 10, 2010

(54) LAMP THERMAL MANAGEMENT SYSTEM

(75) Inventor: Michael J. Dorogi, Newark, OH (US)

(73) Assignee: ABL IP Holding, LLC, Conyers, GA (US)

( * ) Notice: Subject to any disclaimer, the term of this patent is extended or adjusted under 35 U.S.C. 154(b) by 479 days.

(21) Appl. No.: 11/258,983

(22) Filed: Oct. 26, 2005

(65) Prior Publication Data

US 2007/0091610 A1 Apr. 26, 2007

(51) Int. Cl.
*B60Q 1/06* (2006.01)

(52) U.S. Cl. ........................ 362/373; 362/294; 362/547

(58) Field of Classification Search ................. 362/294, 362/547, 264, 373, 353, 343, 378, 448
See application file for complete search history.

(56) References Cited

U.S. PATENT DOCUMENTS

| | | | | |
|---|---|---|---|---|
| 3,372,740 | A * | 3/1968 | Meess et. al. | 165/47 |
| 3,560,728 | A * | 2/1971 | Atkin | 362/294 |
| 3,751,657 | A * | 8/1973 | Sangiamo et al. | 362/294 |
| 4,061,912 | A | 12/1977 | Levasseur | |
| 4,187,534 | A | 2/1980 | Tichenor et al. | |
| 4,337,508 | A | 6/1982 | Moffatt | |
| 4,466,050 | A * | 8/1984 | Lockard | 362/307 |
| 4,498,126 | A * | 2/1985 | Hernandez | 362/220 |
| 4,682,276 | A | 7/1987 | Miller | |
| 4,683,523 | A | 7/1987 | Olsson et al. | |
| 4,760,509 | A * | 7/1988 | Panagiotou | 362/285 |
| 4,780,799 | A | 10/1988 | Groh | |
| 4,829,412 | A | 5/1989 | Pavelin | 362/294 |
| 4,841,422 | A | 6/1989 | Groh | |
| 4,879,638 | A | 11/1989 | Pavelin | 362/294 |
| 5,006,752 | A | 4/1991 | Eggink et al. | 313/161 |
| 5,130,912 | A | 7/1992 | Friederichs et al. | 362/263 |
| 5,174,646 | A | 12/1992 | Siminovitch et al. | 362/218 |
| 5,335,054 | A | 8/1994 | Landa et al. | 355/279 |
| 5,355,054 | A | 10/1994 | Van Lierop et al. | 315/112 |
| 5,422,456 | A | 6/1995 | Dahm | 219/121.63 |
| 5,563,391 | A | 10/1996 | Dahm | 219/121.64 |
| 5,690,424 | A | 11/1997 | Warshauer et al. | |
| 5,720,548 | A * | 2/1998 | Geary | 362/260 |
| 5,738,436 | A | 4/1998 | Cummings et al. | |
| 5,848,080 | A | 12/1998 | Dahm | 372/25 |
| 5,852,339 | A | 12/1998 | Hamilton et al. | 313/11 |
| 5,870,421 | A | 2/1999 | Dahm | 372/75 |
| 6,081,070 | A | 6/2000 | Popov et al. | 313/490 |
| 6,210,024 | B1 * | 4/2001 | Shida | 362/345 |
| 6,330,259 | B1 | 12/2001 | Dahm | 372/35 |
| 6,375,338 | B1 | 4/2002 | Cummings et al. | |
| 6,511,209 | B1 | 1/2003 | Chiang | |
| 6,635,999 | B2 | 10/2003 | Belliveau | |

(Continued)

FOREIGN PATENT DOCUMENTS

| | | |
|---|---|---|
| CA | 2391033 | 8/2003 |

(Continued)

*Primary Examiner*—Gunyoung T Lee
(74) *Attorney, Agent, or Firm*—Ballard Spahr LLP

(57) ABSTRACT

The invention relates to a thermal management system for a lamp. The system comprises a lamp socket that comprises a socket body. The thermal assembly is in thermal communication with the socket body to form a thermal circuit between the lamp and the thermal assembly for dissipating heat generated by the lamp.

9 Claims, 4 Drawing Sheets

U.S. PATENT DOCUMENTS

| | | | | |
|---|---|---|---|---|
| 6,667,567 | B2 | 12/2003 | Fujishiro | 313/46 |
| 6,715,908 | B2 | 4/2004 | Serizawa | |
| 6,774,544 | B2 | 8/2004 | Kim | 313/46 |
| 6,784,601 | B2 * | 8/2004 | Kai et al. | 313/46 |
| 6,974,233 | B1 * | 12/2005 | Aubrey | 362/294 |
| 7,011,431 | B2 * | 3/2006 | Ono et al. | 362/241 |
| 7,144,135 | B2 * | 12/2006 | Martin et al. | 362/294 |
| 7,210,832 | B2 * | 5/2007 | Huang | 362/547 |
| 2002/0135741 | A1 | 9/2002 | Lee et al. | 353/61 |
| 2002/0195953 | A1 | 12/2002 | Belliveau | |
| 2003/0117812 | A1 | 6/2003 | Serizawa | |
| 2003/0222557 | A1 | 12/2003 | Kurachi et al. | 313/46 |
| 2004/0004422 | A1 | 1/2004 | Claus et al. | 313/26 |
| 2004/0169451 | A1 | 9/2004 | Oishi et al. | 313/45 |
| 2004/0213016 | A1 | 10/2004 | Rice | 362/547 |
| 2004/0252502 | A1 | 12/2004 | McCullough et al. | 362/241 |
| 2006/0082315 | A1 * | 4/2006 | Chan | 315/46 |
| 2006/0193139 | A1 * | 8/2006 | Sun et al. | 362/373 |
| 2007/0091622 | A1 * | 4/2007 | Huang et al. | 362/373 |
| 2007/0253202 | A1 * | 11/2007 | Wu et al. | 362/294 |

FOREIGN PATENT DOCUMENTS

| | | |
|---|---|---|
| DE | 19539809 | 4/1997 |
| EP | 341633 | 11/1989 |
| EP | 389659 | 10/1990 |
| EP | 751339 | 2/1997 |
| EP | 71585 | 6/2008 |
| JP | 2006111603 | 4/1994 |
| JP | 2000195332 | 7/2000 |
| JP | 2005071814 | 3/2005 |
| JP | 2006093043 | 4/2006 |

* cited by examiner

LAMP THERMAL MANAGEMENT SYSTEM

FIELD OF THE INVENTION

The present invention pertains to a thermal management system for a lamp. More specifically, the invention relates to an apparatus and method for dissipating heat from a variety of lamp types.

BACKGROUND OF THE INVENTION

There are a variety of lamps used in the lighting industry. Some examples are high intensity discharge (HID), fluorescent, LED and incandescent. Each of these lamps emits energy in the form of radiant energy and heat in various amounts. For example, a 400 watt metal halide lamp converts approximately 110 watts to visible energy, 20 watts to UV energy, 70 watts to IR energy, while the remaining 200 watts of energy is converted to heat and dissipated to the surrounding environment via conduction through the lamp base and convection off the glass envelope.

A significant amount of energy is converted to heat by the lamp. In any luminaire design, the heat generated by the lamp can cause problems related to the basic function of the lamp and luminaire. The benefit of effective removal of thermal energy from within the luminaire will be improved luminaire life, smaller package sizes, and in some cases, better lumen output. An additional benefit to removing heat from the luminaire is that the luminaire can then be operated in a higher ambient temperature environment without compromising life or performance.

Additionally, most HID lamps do not re-ignite immediately after a momentary power outage causes them to extinguish. They must be allowed to cool down to an acceptable temperature to allow the arc to be re-ignited. The luminaire and its surroundings can have a significant effect on the length of time it takes an HID lamp to cool down enough to re-ignite. In some applications, an auxiliary lamp (usually quartz) is used to provide backup lighting when momentary power interruptions cause the HID lamp to extinguish. The backup lighting provides minimal acceptable lighting levels until the HID lamp has cooled enough to re-ignite. Occasionally, the auxiliary lamp adds enough heat that the HID lamp never cools down enough to re-ignite. Therefore, an additional benefit of cooling the luminaire is reduced hot re-strike time of an HID lamp.

There are three mechanisms by which thermal energy from the lamp is dissipated: conduction, convection, and radiation. Conduction occurs where physical contact is made between mounting components of the lamp to the lamp housing. Traditional means of providing electrical and mechanical contact between lamp and luminaire provide poor means for conduction to occur between the lamp and external luminaire surfaces. In addition, the location of the lamp and socket are often determined by the desired optical performance of the luminaire. This often necessitates that the socket and lamp be mounted on bosses or other structures that further impede the conductive transfer of heat out of the luminaire envelope, either by creating a longer thermal path, introducing additional thermal interfaces, introducing materials with a lower thermal conductivity, or some combination thereof.

Convection can occur at any surface exposed to air and is limited by the movement of air around the lamp and the difference between the temperature of the lamp surface and the air surrounding it. In many cases, the luminaire may be enclosed, which further exacerbates heat related failures. For example, in luminaires with electronic ballasts and components, the excessive heat can shorten the life of the electronic components causing premature failure of the lighting system.

Radiation is the movement of energy from one point to another via electromagnetic propagation. Much of the radiant energy escapes a luminaire through the optical elements and reflectors. What radiant energy that does not escape is absorbed by the various materials within the luminaire and converted into heat.

Of these three modes of thermal transfer, providing an effective conduction path often allows the greatest amount of controlled heat removal from within a luminaire. This is especially pertinent for luminaires that are enclosed to meet the requirements of the application. Open luminaires can provide good convective energy transfer, but due to limitations of luminaire construction or other application requirements, cannot always provide adequate cooling of the luminaire.

The socket and lamp of many of these luminaire are mounted directly to the lamp housing. The lamp housing contains thermally sensitive electronic components. Even though the luminaire is “open”—a significant amount of heat is transferred to the lamp housing via conduction and convection. By providing an alternative conduction path and dissipation area, a significant reduction in thermal transfer to the lamp housing can be implemented. Good thermal management based on conduction of energy from lamp should be considered.

SUMMARY

The present invention pertains to a thermal management system for a lamp. More specifically, the invention relates to an apparatus and method for dissipating heat from a variety of lamp types.

In one aspect, the lighting assembly comprises a lamp socket and a lamp housing. In this aspect the lamp socket has a socket body that defines an interior cavity. Additionally, in a further aspect, the lamp socket can comprise a socket sleeve substantially disposed within a portion of the interior cavity of the socket body. In this aspect, a portion of an interior surface of the socket sleeve is shaped for complementary engagement with at least a portion of the engagement end of the lamp. As one skilled in the art will recognize, the engagement end may comprise a threaded surface or any other conventional engagement end known in the art.

For the purposes of dissipating heat from the lamp, the lighting assembly also comprises a thermal assembly. The thermal assembly is in thermal communication with the socket body, thereby forming a thermal circuit between the lamp and the thermal assembly. In one aspect, a portion of the socket body is connected to a portion of the lamp housing, which may comprise a thermally conductive material.

DETAILED DESCRIPTION OF THE DRAWINGS

These and other features of the preferred embodiments of the present invention will become more apparent in the detailed description, in which reference is made to the appended drawings wherein.

DETAILED DESCRIPTION OF THE INVENTION

Figure 1:
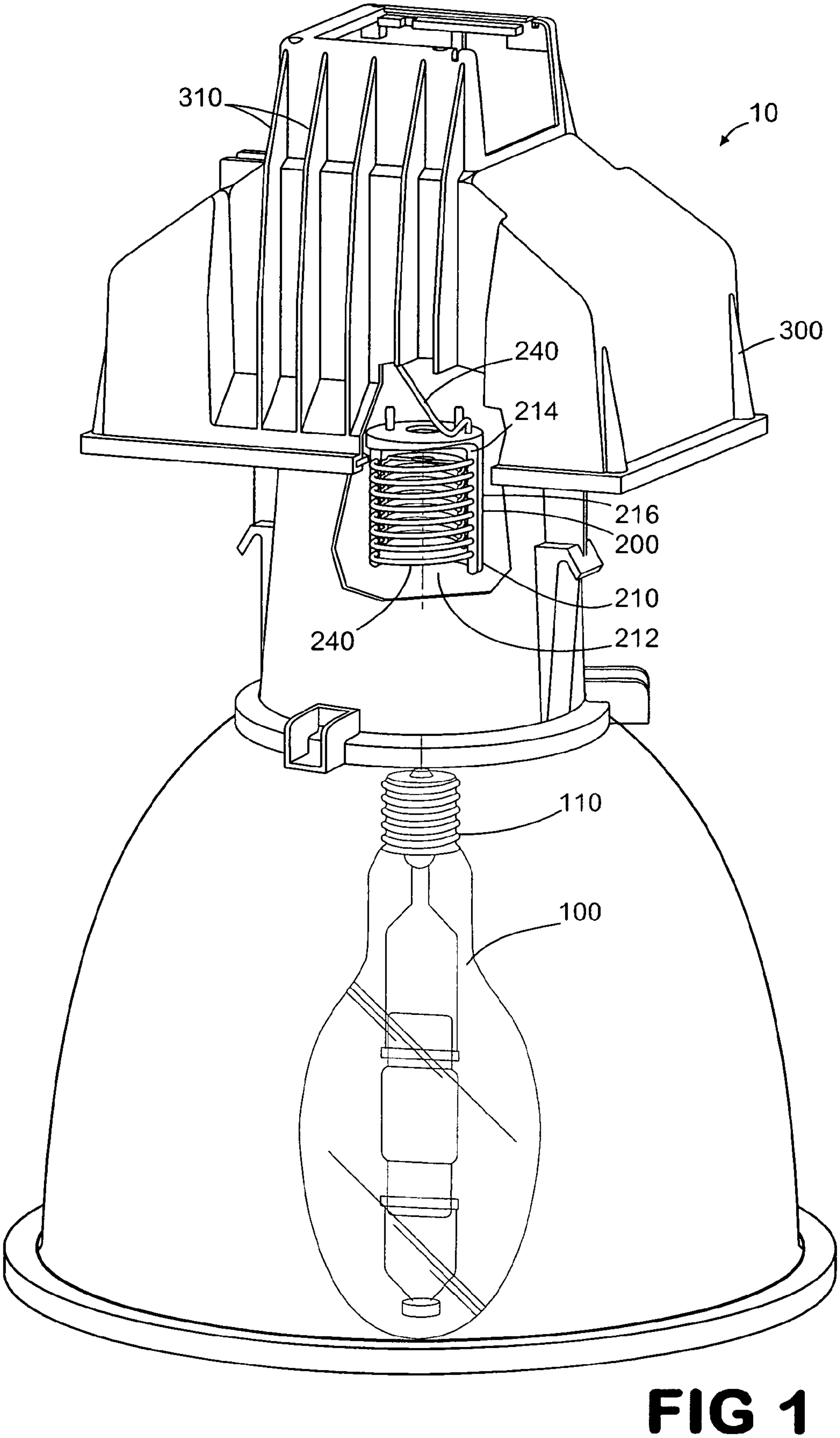
FIG. 1 is a partially cut away perspective view of one aspect of the lighting assembly of the invention showing a thermal assembly embedded within the socket body.
Figure 2:
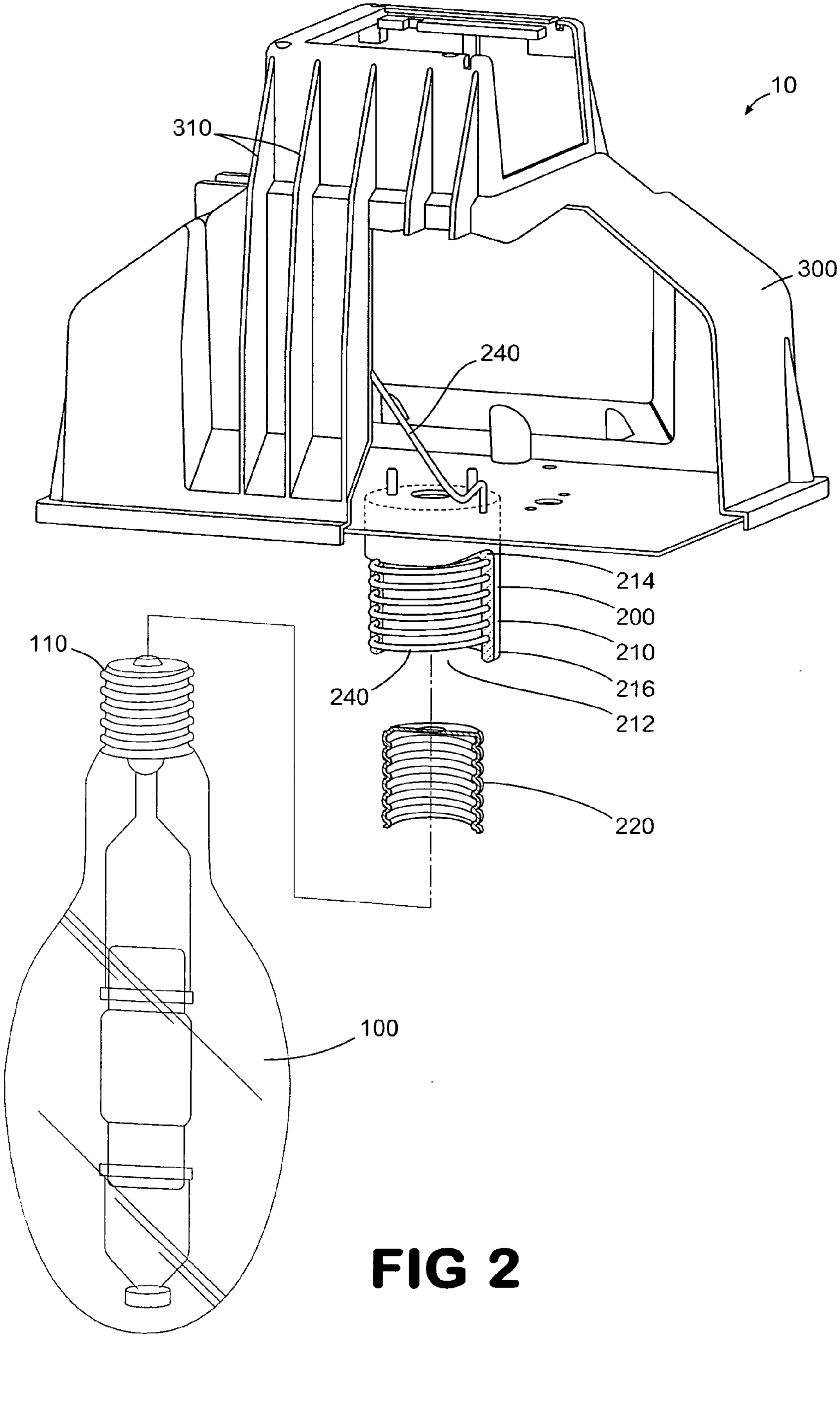
FIG. 2 is a partially cut away exploded perspective view of the lighting assembly of FIG. 1, showing a partial cut away view of the socket body and the socket shell.

Before the present articles, devices, assemblies and/or methods are disclosed and described, it is to be understood that this invention is not limited to the specific articles, devices, assemblies and/or methods disclosed unless otherwise specified, as such may, of course, vary. It is also to be understood that the terminology used herein is for the purpose of describing particular embodiments only and is not intended to be limiting.

As used herein, the singular forms "a," "an" and "the" include plural referents unless the context clearly dictates otherwise. The embodiments are described with reference to the figures, in which like numbers indicate like parts throughout the figures.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

The invention is a lamp socket 200 for use with a lamp 100. Inherently, the lamp 100 will have an engagement end 110. In one aspect, the lamp socket 200 comprises a socket body 210 defining an interior cavity 212 and a socket sleeve 220 disposed within at least a portion of the socket body 210. In at least one aspect, the socket sleeve 220 is adapted for engagement with at least a portion of the engagement end of the lamp. As one in the art will appreciate, the socket body 210 may be adapted to engage a portion of the engagement end of the lamp, alleviating the need for a socket sleeve. The engagement end 110 of the lamp may comprise a screw type end, a pin based end, or any other conventional bulb engagement end.

The lamp socket 200 also comprises a thermal assembly 240 for heat dissipation. A portion of the thermal assembly 240 is in thermal communication with the socket body, thereby forming a thermal circuit between the lamp 100 and the thermal assembly 240. The thermal circuit is a pathway for dissipating heat generated by the lamp.

In one aspect of the invention, the thermal assembly is a heat pipe, which may be of almost any shape. For example, and not meant to be limiting, the heat pipe may be substantially straight; it may be helical, or any other shape reasonable for the application. Regardless of the shape, the thermal assembly may be connected to the socket body in a number of fashions, as long as there is thermal communication between the thermal assembly 240 and the socket body 210. For instance, an exemplary method of connecting the thermal assembly 240 to the socket body 210 is to embed at least a portion of the thermal assembly within the wall 214 of the socket body. In another example, the thermal assembly may be connected to an exterior portion 216 of the socket body.

In one embodiment, the invention is a lighting assembly 10 incorporating the lamp socket 200 as described herein above with a lamp housing 300. In one aspect, a portion of the socket body 210 is connected to a portion of the lamp housing 300.

In another aspect of the invention, a portion of the thermal assembly 240 is in thermal communication with a portion of the lamp housing 300. Although it is not a requirement, the thermal dissipation is further enhanced when the lamp housing is comprised of a thermally conductive material. Still further dissipation can be achieved when the external surface of the lamp housing 300 comprises one or more fins 310. When fins are present, the thermal dissipation is promoted when a portion of the thermal assembly 240 is connected to, or even embedded within, the fins 310 thereon the lamp housing.

Figure 3:
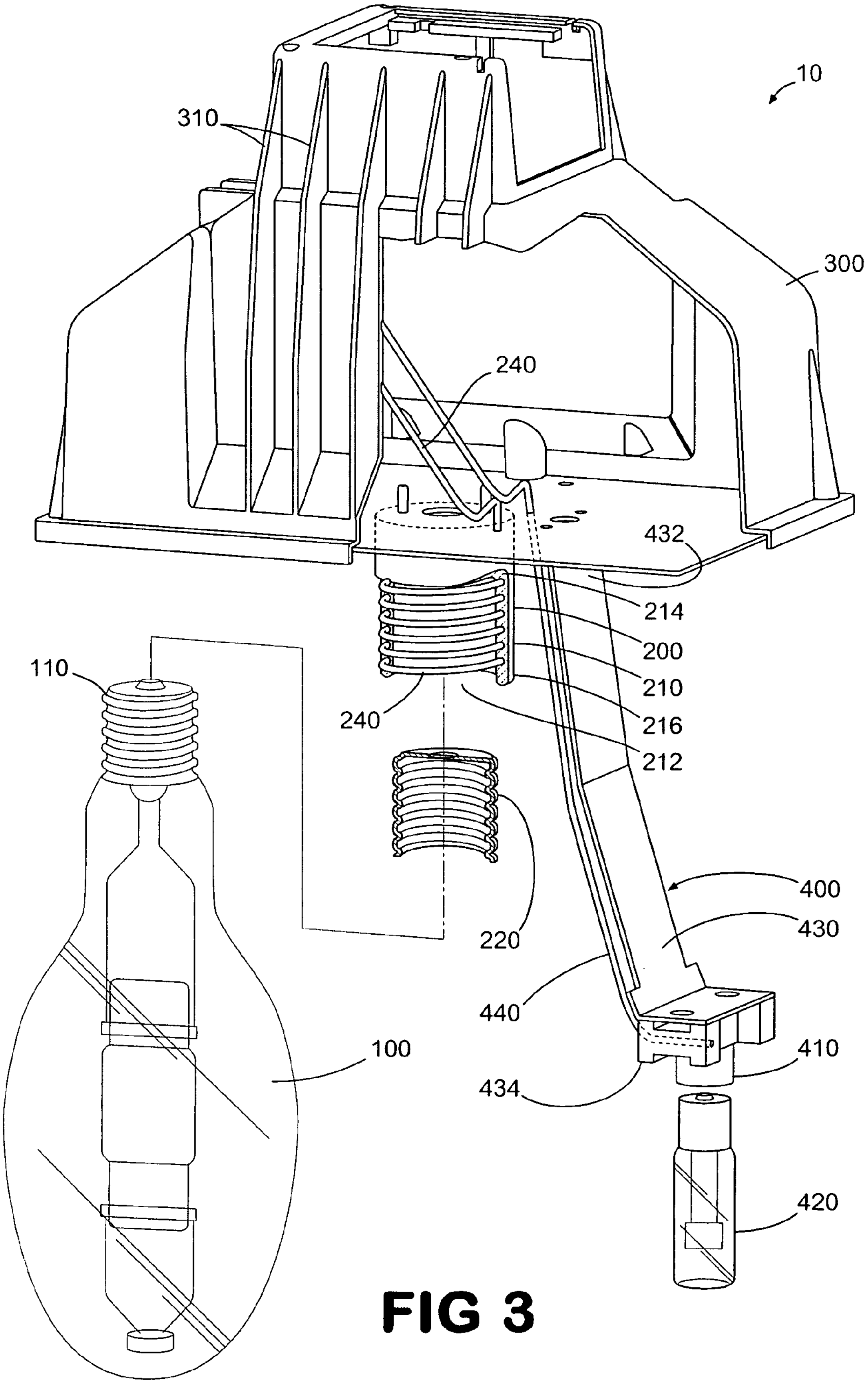
FIG. 3 is a partially cut away exploded perspective view of the lighting assembly of FIG. 1, illustrating the auxiliary lighting assembly connected to the lamp housing.
Figure 4:
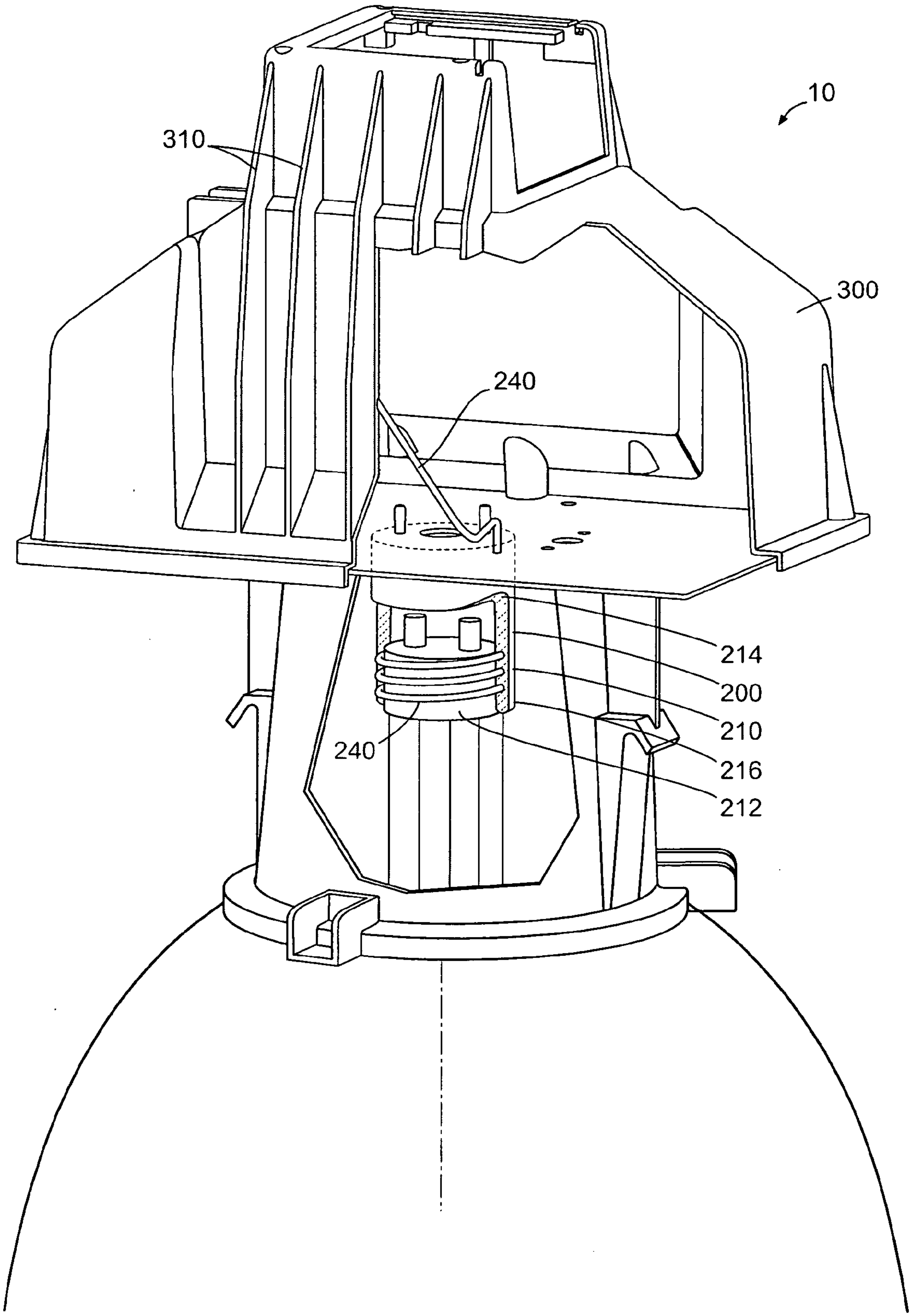
FIG. 4 is a partially cut away exploded perspective view of the lighting assembly of FIG. 1, illustrating the lighting assembly with a pin-based lamp.

In yet another aspect of the invention, the lighting assembly 10 also comprises an auxiliary lighting assembly 400. In this aspect, as illustrated in FIG. 3, the auxiliary lighting assembly has an auxiliary lamp socket 410 adapted for engagement with an auxiliary lamp 420. Additionally, in this aspect, a bracket assembly 430 is connected to a portion of the lamp housing 300 on its first end 432, while the second end 434 is connected to a portion of the auxiliary lamp socket. The purpose of the auxiliary lighting assembly 400 is to provide auxiliary lighting in the event of a power outage or a delayed start-up of the main lamp 100. In applications, such as HID, when there is an outage, the lamp 100 needs to cool down sufficiently in order to re-ignite. In the meantime, when power is restored, a small auxiliary lamp 420 is used to provide interim lighting.

One issue that may arise when using an auxiliary lighting assembly concerns heat which may be generated by the auxiliary lamp itself. If the heat from the auxiliary lamp 420 is excessive and is not dissipated, it will delay or prevent the re-ignition of the main lamp 100. Therefore, in one aspect, the auxiliary lighting assembly 400 has its own auxiliary thermal assembly 440. In this aspect, a portion of the auxiliary thermal assembly is in thermal communication with the auxiliary lamp socket 410, forming a thermal circuit between the auxiliary lamp 420 and the auxiliary thermal assembly 440.

In one aspect of the auxiliary lighting assembly, a portion of the auxiliary thermal assembly is in thermal communication with a portion of the housing. Similar to the aspect mentioned above, the auxiliary thermal assembly 440 may be a heat pipe.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

I claim:

1. A lighting assembly for use with a lamp having an engagement end, comprising:

a lamp socket, the lamp socket comprising:

a socket body defining an interior cavity;

a socket sleeve substantially disposed within a portion of the interior cavity of the socket body, wherein a portion of an interior surface of the socket sleeve is shaped for complementary engagement with at least a portion of the engagement end of the lamp; and a heat pipe, wherein at least a portion of the heat pipe is embedded within the socket body and wherein the heat pipe is in thermal communication with the socket body to form a thermal circuit between the lamp and the heat pipe; and a lamp housing, wherein a portion of the socket body is connected to a portion of the lamp housing.

2. The lighting assembly of claim 1, wherein a portion of the heat pipe is in thermal communication with a portion of the lamp housing.

3. The lighting assembly of claim 1, wherein the lamp housing is comprised of a thermally conductive material.

4. The lighting assembly of claim 1, wherein the external surface of the lamp housing comprises a plurality of fins.

5. The lighting assembly of claim 4, wherein a portion of the heat pipe is embedded within at least a portion of the fins.

6. The lighting assembly of claim 1, wherein the socket body comprises a circumferential wall, and wherein at least a portion of the heat pipe is embedded within the circumferential wall of the socket body.

7. The lighting assembly of claim 1, further comprising an auxiliary lighting assembly, the auxiliary lighting assembly comprising:

an auxiliary lamp socket configured for engagement with an auxiliary lamp; and a bracket assembly having a first end and a spaced second end, wherein the first end is connected to a portion of the lamp housing and the second end is connected to a portion of the auxiliary lamp socket.

8. The lighting assembly of claim 7, wherein the auxiliary lighting assembly further comprises an auxiliary heat pipe, wherein a portion of the auxiliary heat pipe is in thermal communication with the auxiliary lamp socket to form a thermal circuit between the auxiliary lamp and the auxiliary heat pipe.

9. The lighting assembly of claim 8, wherein a portion of the auxiliary heat pipe is in thermal communication with a portion of the housing.

* * * * *